United States Patent
Stek et al.

(10) Patent No.: US 7,178,083 B1
(45) Date of Patent: Feb. 13, 2007

(54) DEVICE FOR SCANNING AN INFORMATION CARRIER, METHOD OF MANUFACTURING, AND INFORMATION CARRIER

(75) Inventors: Aalbert Stek, Eindhoven (NL); Roel Van Woudenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1424 days.

(21) Appl. No.: 09/786,102

(22) PCT Filed: Jul. 5, 2000

(86) PCT No.: PCT/EP00/06372

§ 371 (c)(1),
(2), (4) Date: Feb. 28, 2001

(87) PCT Pub. No.: WO01/04895

PCT Pub. Date: Jan. 18, 2001

(30) Foreign Application Priority Data

Jul. 13, 1999 (EP) .................................. 99202286

(51) Int. Cl.
*H03M 13/00* (2006.01)

(52) U.S. Cl. ...................... 714/758; 714/784; 714/768
(58) Field of Classification Search .............. 714/746
See application file for complete search history.

(56) References Cited

U.S. PATENT DOCUMENTS

| 4,364,081 | A   |   | 12/1982 | Hashimoto et al. ........... 358/13 |
| 4,413,340 | A   |   | 11/1983 | Odaka et al. ................ 371/39 |
| 5,995,460 | A   | * | 11/1999 | Takagi et al. ............ 369/53.18 |
| 6,081,651 | A   | * |  6/2000 | Kim ......................... 386/111 |
| 6,115,227 | A   | * |  9/2000 | Jones et al. ................ 361/119 |
| 6,216,201 | B1  | * |  4/2001 | Ado et al. .................. 711/112 |
| 6,353,890 | B1  | * |  3/2002 | Newman ..................... 713/193 |

* cited by examiner

*Primary Examiner*—Albert Decady
*Assistant Examiner*—Esaw Abraham
(74) *Attorney, Agent, or Firm*—Michael E. Belk

(57) ABSTRACT

A device reads an information carrier that carries identification and user information. The identification information is arranged so as to be spread over the information carrier and includes data and parities. The device includes a reader for reading the information from the information carrier and error corrector correcting errors in the information. The device further includes an organizer for organizing the information in such a way that both the identification and user information can be processed by the error corrector.

16 Claims, 3 Drawing Sheets

Figure 1:
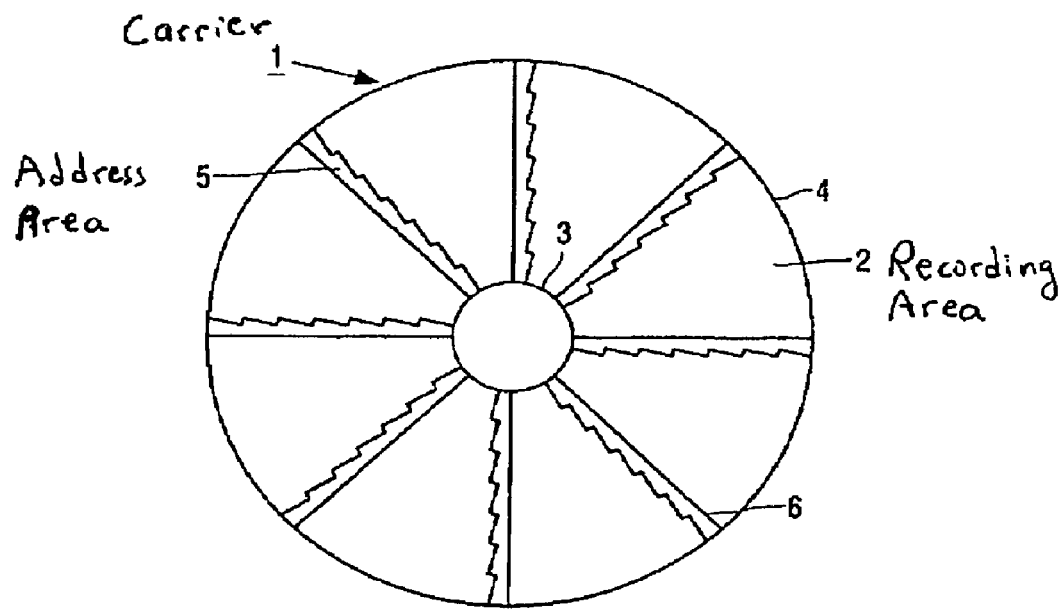

DEVICE FOR SCANNING AN INFORMATION CARRIER, METHOD OF MANUFACTURING, AND INFORMATION CARRIER

The invention relates to a device for scanning an information carrier, which information carrier carries identification information and user information, the identification information being spread over the information carrier and the information including data and parities, which device includes read means for reading the information present on the information carrier, the device including error correction means for the correction of errors in the information.

The invention further relates to a method of manufacturing an information carrier, the method comprising the following steps: a. receiving identification information, b. calculating parities on the basis of the identification information, c. adding the parities to the identification information, d. outputting the identification information and parities, e. providing the information carrier with the identification information and parities.

The invention further relates to an information carrier carrying identification information, the identification information being arranged so as to be spread over the information carrier.

A device of the type defined in the opening paragraph is known, inter alia from U.S. Pat. No. 4,364,081. Said document discloses an apparatus for processing information in the form of a digital video signal. The signal is comprised of actual video signals and identification signals. The identification signals may specify for example the track number, the frame number, the field number or the line number of the video signal.

The video signals and the identification signals may be generated for example by reading an information carrier, for example a rewritable information carrier, such as a CD-RW, a DVD-RW, or a DVR information carrier. Hereinafter, the information corresponding to video signals on such an information carrier will be referred to as user information and the information corresponding the identification signals on such an information carrier will be referred to as identification information. This identification information may include address information as well as disc information, both stored in for example address information areas. In the case of video signals this address information may for example specify the position of the video information in each field. The disc information may relate to a variety of information carrier parameters.

Both the identification information and the user information should be protected from, for example, scratches and dirt present on the information carrier. For this purpose, parities are added to the information. By means of these parities these errors can be corrected. Since the invention relates to the error-correction processes as such and since error correction by the addition of parities is generally known to one skilled in the art, reference is made to U.S. Pat. No. 4,413,340 (PHQ 80.009) for an example of an error correction process. Said document discloses the process used for error correction of the Digital Audio Compact Disc.

As stated hereinbefore, a rewritable information carrier carries a plurality of different types of data, for example the identification information and the user information. Parities are added to each type of data in order to allow error correction. This correction is a computation-intensive and costly operation in terms of IC area.

It is an object of the invention to realize a device in which errors on an information carrier to be scanned are corrected in an efficient manner by means of an error correction code.

To this end, according to the invention, a device for scanning an information carrier of the type defined in the opening paragraph is characterized in that the device further includes organizing means for organizing the information in such a manner that both the identification information and the user information can be processed by the error correction means.

By thus organizing the information it is possible to use the same hardware for the correction of errors present in the different types of information. This simplifies the device because only one type of error correction means has to be included, which has a positive effect on the production cost of the device.

The invention is based inter alia on the recognition of the fact that, although the different types of data have different formats, the same error correction means can be used for the correction of errors present in the data by organizing these different types of data, which in point of fact means that blocks of identification information and blocks of user information of the same magnitude are generated, said identification information consisting of comparatively small items of information which, by virtue of their nature, are stored in such a way that they spread over the information carrier.

In accordance with a second aspect of the invention a device of the type defined in the opening paragraph is characterized, according to the invention, in that the identification information comprises permanent information and in that the user information comprises rewritable information.

The permanent information is, for example, information already present on a rewritable optical information carrier, such as a CD-RW, a DVD-RW or a DVR information carrier. This information may include, for example, address information and disc parameters. The rewritable information is, for example, if which can be stored on these rewritable optical information carriers by the end user.

In accordance with another aspect of the invention a device of the type defined in the opening paragraph is characterized, according to the invention, in that the permanent information comprises address information and disc information.

In said address information the permanent information may include address information and disc information. The address information then comprises, for example, information about the track numbers and sector numbers. The disc information then comprises a large number of information carrier parameters.

In accordance with a further aspect of the invention a device of the type defined in the opening paragraph is characterized, according to the invention, in that the organization means further include addition means for adding dummy bytes of predetermined value to the identification information.

This device has the advantage that it is thus nearly always possible to give the different types of data the appropriate format in an efficient manner so as to allow a faster error correction to be achieved. This can be useful in the case that the magnitude of an identification information block is not a submultiple of the magnitude of a user information block. At the instant that a given type of data cannot be given the desired format with only the rewritable information and the permanent information, dummy bytes are added in order to obtain said desired format. Since said addition of the dummy bytes is effected in the device for scanning the information carrier this addition does not result in a lower data capacity (i.e. the capacity for rewritable information) on the information carrier. In order to enable the data to be corrected appropriately with the aid of the error correction means it is obvious that during the computation of the parities associated with the data (this is effected before the data is written onto the information carrier) the value of these dummy bites must be known so as to allow the correct parities to be computed. This will be evident to this skilled in the art of error correction techniques. Only in this way is it possible to calculate the parities which enable error correction after read-out and demodulation of the data.

A further embodiment is characterized in that the device further includes write means.

By including in the device, in addition to read means, write means for the formation of optically readable marks on an information carrier of a recordable type, the device can perform read functions as well as recording functions.

A further embodiment is characterized in that the organization means are further adapted to collect the identification information by reading the address information areas of a predetermined number of tracks and subsequently organizing the address information thus read.

A further embodiment is characterized in that the predetermined number of tracks is two, each track including eight address information areas, each address information area comprising 15 bytes of address information, and in that the addition means are adapted to add eight dummy bytes of non-zero value to the identification information, particularly the value FF in hexadecimal notation.

The choice of the predetermined value of the dummy bytes is not arbitrary. By giving the dummy bytes a non-zero value (in the present case the value FF in hexadecimal notation) it is prevented that the parities to be calculated all assume the value zero in the case that the Disc Info comprises only zeros. Indeed, in the case that both the dummy bytes and the Disc Info comprise only zeros this will result in all parities having the value zero when the parities are calculated.

The invention further relates to a method of manufacturing, which is characterized in that the identification information is arranged so as to be spread over the information carrier.

The invention further relates to an information carrier, which is characterized in that the identification information comprises parities calculated on the basis of the identification information.

Figure 2:
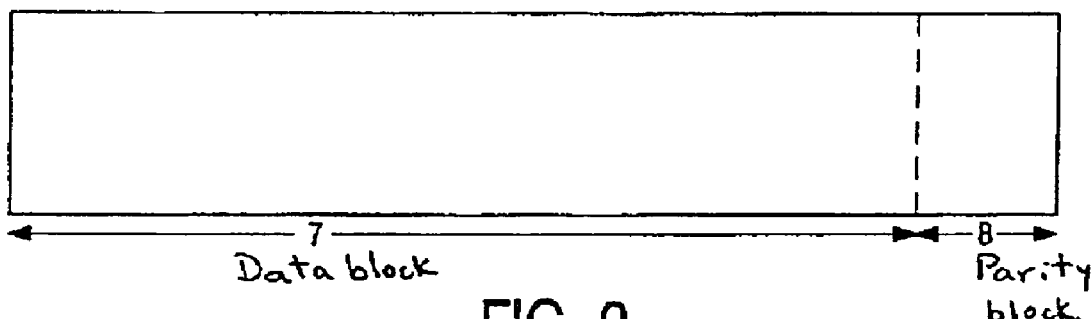
Figure 3:
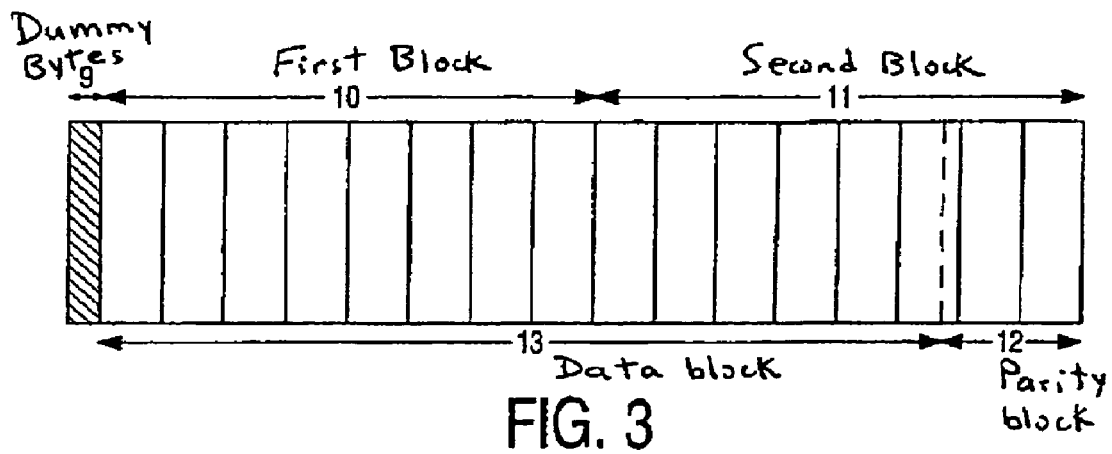
Figure 4:
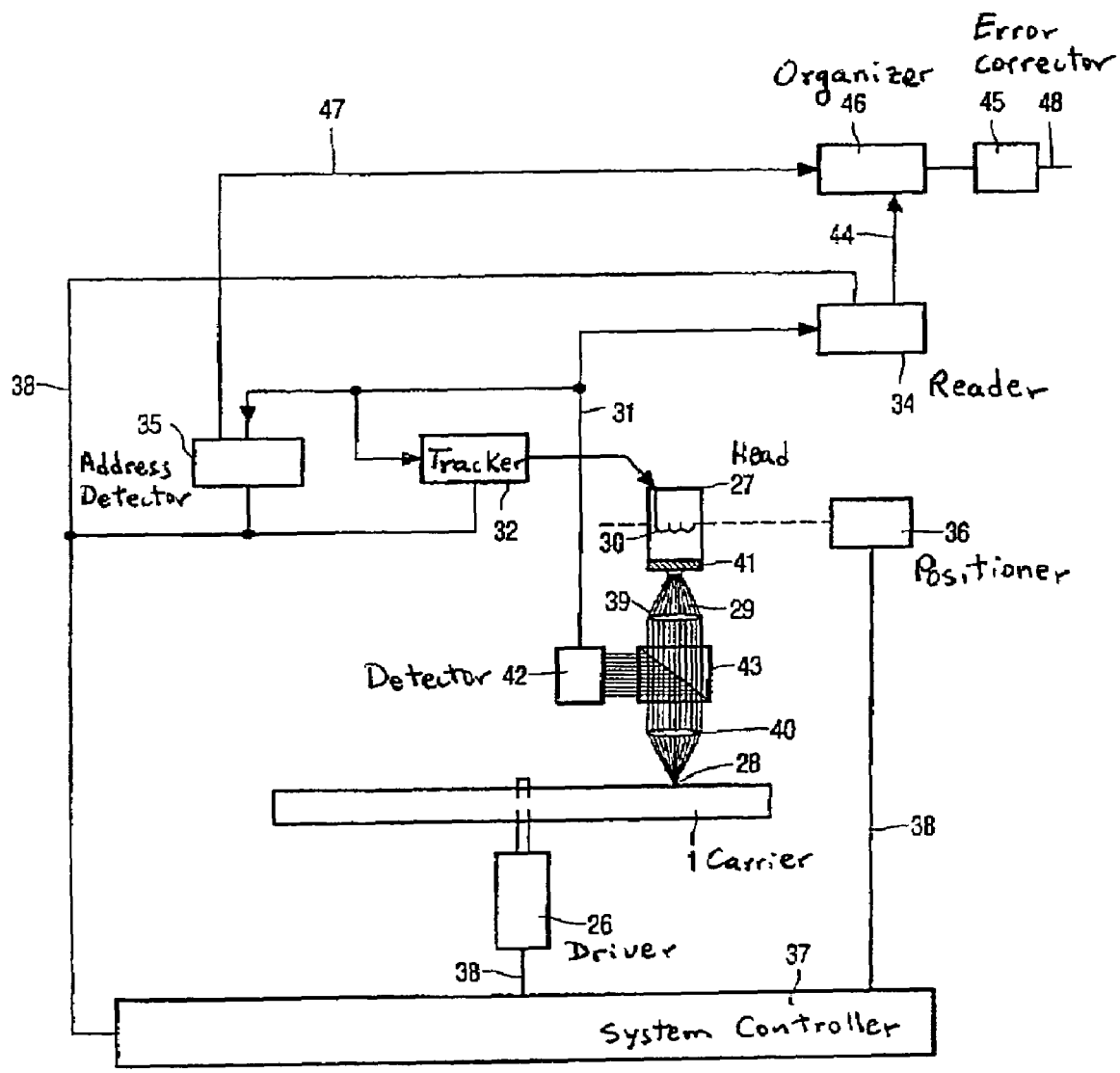
Figure 5:
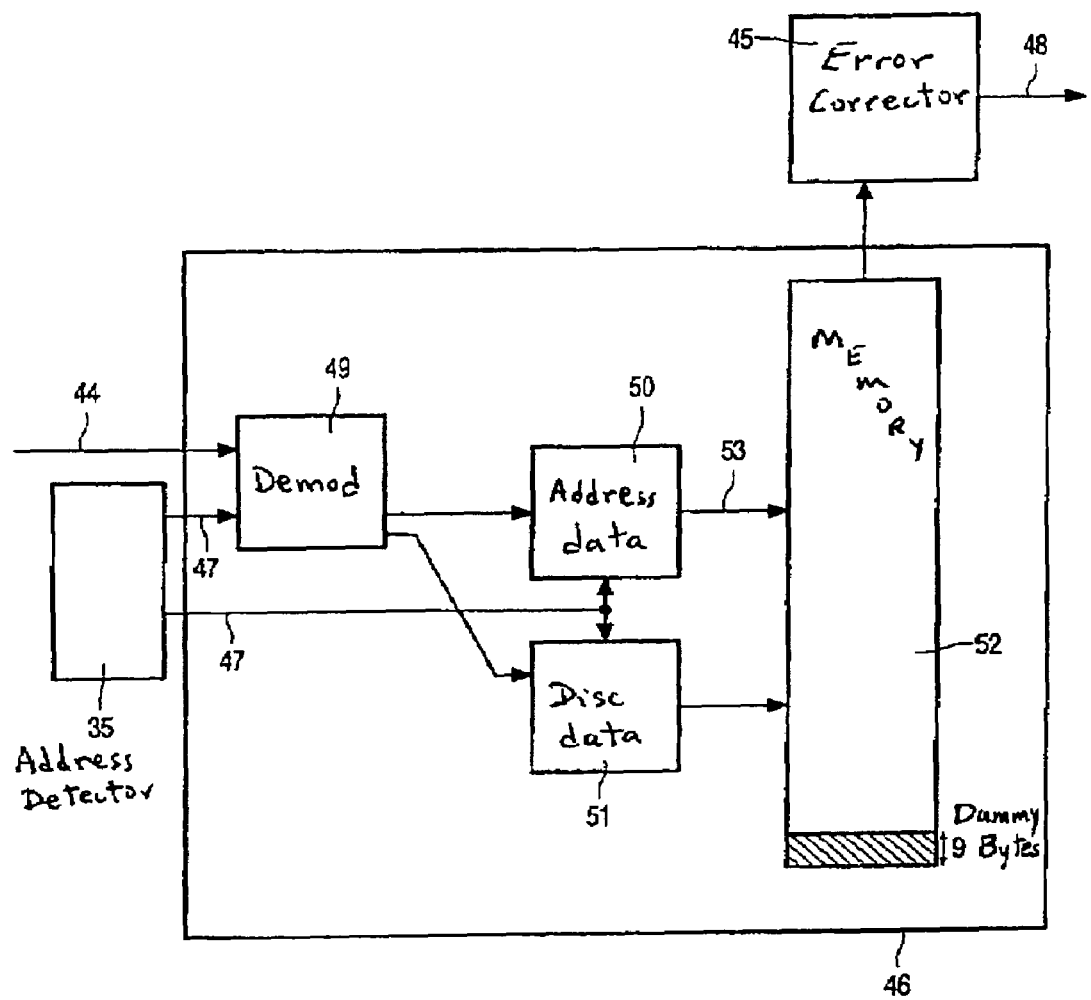

These as well as further aspects of the invention will become apparent from and will be elucidated by means of the following description of the embodiments with reference to the accompanying drawings, in which FIG. 1 diagrammatically shows a rewritable information carrier, FIG. 2 shows an example of the structure of a data block with parities of rewritable data on a so-called DVR information carrier, FIG. 3 shows an example of the structure of a header block on a DVR information carrier, FIG. 4 diagrammatically shows a device for scanning an information carrier, and FIG. 5 shows an example of the organization means.

Like elements in different Figures bear identical reference numerals.

FIG. 1 diagrammatically shows a rewritable information carrier 1, in the present case a DVR information carrier. The invention is not limited to a DVR information carrier but is can also be applied to any other information carrier such as, for example, a CD-RW or a DVD-RW. The information carrier 1 has a recording area 2 having an inner diameter 3 and an outer diameter 4. The recording area 2 consists of tracks (not shown in FIG. 1), in the present case with a land/groove recording, which are intersected by address information areas 5. The starting points of the address information areas are radially aligned along the radial lines 6. This layout of the information carrier serves to illustrate the invention.

As stated, the address information areas comprise information relating to a multitude of information carrier parameters. By way of example the following disc parameters are mentioned: disc category, version number, disc size, maximum transfer rate, the number of recording layers, the type of recording layer (for example rewritable) and recording speed.

FIG. 2 shows an example of the structure of a data block with parities of rewritable data on a so-called DVR information carrier. The data block 7 comprises 216 bytes of data, the data in the data block being protected by a Reed Solomon Code having 32 parities 8. The total length is consequently 248 bytes or 248 symbols. In the present case, one symbol has a size of a one byte. This data block is obtained by reading the rewritable information on the DVR information carrier. In the present case, the size of one block is 248 bytes.

FIG. 3 shows an example of the structure of a header block on a DVR information carrier. In the present example, the header block comprises disc information (see 51 in FIG. 5). In this case the header block does not include address information (see 50 in FIG. 5). As a result of this, every header block generated is identical. Each address information area 5 of FIG. 1 includes a header with 15 bytes of Disc Info. Thus, one revolution includes 8 headers having 120 bytes in total. The first Disc Info block 10 is obtained by reading the 8 headers in one revolution and combining them. The second Disc Info block 11 is obtained by reading the 8 headers in the next revolution and combining them. This second Disc Info block 11 includes the 32 bytes of parities 12. The data 13 thus comprises the first Disc Info block 10 and most part of the second Disc Info block 11. In order to allow the two Disc Info blocks comprising 240 bytes in total with the same error correction code the first 8 bytes, represented by the dummy block 9, are added by defining then at FF in hexadecimal notation in the decoder (or in the organization means 46, see FIG. 4). This means that these bytes are not on the disc. In this way, both the header information and the rewritable information can be corrected by means of the same hardware. Thus, the total header block, just like the data block, comprises 120+120+8=248 bytes. This standard header block is referred to as a frame. As stated, the header blocks include a multitude of disc parameters. Since these parameters relate to one and the same information carrier each header block has the same content. In the present example the header block is generated by reading two successive groove tracks or two successive land tracks with address information areas. These address information areas may be provided all over the information carrier but their presence may also be restricted to the so-termed lead-in zone and/or the lead-out zone.

It will be evident that both FIG. 2 and FIG. 3 show the logic structures of the data and header blocks and not their physical structures because, for example, the Disc Info is present in the headers spread over the information carrier.

FIG. 4 diagrammatically shows a device for scanning an information carrier, for example the DVR information carrier as shown in FIG. 1. The device has drive means 26 for rotating the information carrier 1 and a read head 27 for reading the tracks on the information carrier. The read head 27 comprises an optical system of a known type intended for generating a light spot 28 focused on a track of the information carrier by means of a light beam 29 guided by optical elements such as a collimator lens 39, for collimating the light beam, and an objective lens 40, for focusing the light beam. This light beam 29 is produced by a radiation source 41, for example an infrared laser diode having a wavelength of 780 nm and an optical power of 3 mW. The read head 27 further includes an actuator adapted to focus the light beam 29 onto the information carrier and a tracking actuator 30 for the fine positioning of the light spot 28 in a radial direction in the center of the track. In addition, following the track with the laser beam can also be achieved by varying the position of the objective lens 40. After being reflected from the information carrier the light beam 29 is detected by a detector 42 of a known type, for example a quadrant detector, which generates detector signals 31 including a read signal, a tracking error signal, a focus error signal, a synchronizing signal and a lock-in signal. For this purpose, use can be made of, for example, a beam splitting cube 43, a polarizing beam splitting cube, a pellicle or a retarder.

The device includes tracking means 32 coupled to the read head 27 to receive the tracking error signal from the read head 27 and to control the tracking actuator 30. During reading the read means 34 receive the read signal. The read signal 44 is subsequently transferred to and received by the organization means 46. In these organization means 46 the read signal is demodulated. The method of demodulating obviously depends on the method by which the data has been modulated (for a more detailed description of this process reference is made to the example as shown in FIG. 5). It is possible that the rewritable information has been modulated in another manner than the permanent information present in the headers, i.e. the rewritable information for example with a so-termed (1,7) RLL code and the permanent information for example with a (2,7) RLL code. The device further includes an address detector 35, for detecting the addresses and the Disc Info present in the header fields, and positioning means 36 for the coarse positioning of the read head 27 in a radial direction of the track. On the basis of the signals 47 obtained from the address detector 35 the organization means 46 can generate the data blocks and header blocks as shown in FIG. 2 and FIG. 3 and can supply these blocks to the error correction means 45, thus enabling both the permanent information and the rewritable information present on the DVR information carrier to be corrected by the same error correction means 45. In order the enable the data blocks and the header blocks to be generated from the demodulated read signal the organization means should store the Disc Info bytes of two revolutions and should combine them with 8 dummy bytes so as to form a header block (or Disc Info block) of 248 bytes. Said addition of the dummy bytes is effected by addition means. These addition means form part of the organization means 46. Thus, the dummy bytes are added to the header block after the demodulation of the read signal. After error correction in the error correction means 45 the error-corrected demodulated signal 48 is available at the output for further processing.

The device further includes a system control unit 37 adapted to receive commands from a controlling computer system or from a user and to control the device by means of control lines 38, for example a system bus connected to the drive means 26, the positioning means 36, the address detector 35, the tracking means 32 and the read means 34. For this purpose, the system control unit 37 includes a control circuit, for example a microprocessor, a program memory and control gates for carrying out the processes as described hereinafter. The system control unit 37 may also be implemented in a state machine in logic circuits.

In another embodiment the device may include, in addition to the read means 34, write means for forming optically readable marks on an information carrier of a recordable type, which enables the device to perform both read functions and recording functions.

FIG. 5 shows an example of the organization means. As stated, the organization means 46 take care that the various ECC blocks, i.e. the header blocks and the data blocks, are generated. In FIG. 5 this is illustrated for the generation of the header blocks. The read signal 44 and the signal 47 from the address detector 35 are applied to the demodulator 49 to the control the demodulation. The demodulator demodulates the read signal 44 and splits the demodulated read signal into an address data component 50 and a Disc Info component 51. The address data serves as a so-called pointer 53 for storing the Disc Info at the correct location in the memory 52. The address data inter alia includes the track number and the segment number. On the basis of this information it is possible to calculate at which position the Disc Info is to be stored (for example that the Disc Info of each even track number and $0^{th}$ segment is to be stored at the first position of the memory 52). The signal 47 from the address detector 35 is added to the address data component 50 and the Disc Info component 51 in order to control the splitting of the demodulated read signal. The Disc Info in the Disc Info component is subsequently loaded into the memory 52. Once the entire memory has been loaded with Disc Info (and the dummy bytes 9) this information can be applied to the error correction means 45.

Likewise, the data blocks associated with the rewritable information can be generated and supplied to the same error correction means 45.

Although the invention has been described with reference to the above embodiments, it is obvious that alternative embodiments may be used in order to achieve the same goal. For example, the invention is by no means limited to the present example of data and header blocks of 248 bytes. Any length is possible for the data and header block. In addition, any arbitrary number of dummy bytes may be added to the rewritable information and/or the permanent information. Moreover, the invention is neither limited to error correction processes where each symbol has the size of one byte. The error correction process to be used for the present invention is not limited to the method of error correction as described in U.S. Pat. No. 4,413,340; alternatively, other known error correction processes such as the product code or the picket code may be used.

Furthermore, the invention is assumed to reside in any novel feature and/or combination of features.

The invention claimed is:

1. A device for scanning an information carrier that carries identification information and user information, the identification information being spread over the information carrier, both the identification information and the user information including data and parities, the device comprising:

read means for reading the information present on the information carrier, error correction means for correcting errors in the identification information and the user information, and organization means for organizing the identification information and the user information in such a manner that both the identification information and the user information are processable by the error correction means.

2. The device as claimed in claim 1, wherein the identification information comprises permanent information and the user information comprises rewritable information.

3. The device as claimed in claim 2, wherein the permanent information comprises address information and disc information.

4. The device as claimed in claim 1, wherein the organization means include addition means for adding dummy bytes of predetermined value to the identification information.

5. The device as claimed in claim 1, further comprising write means.

6. The device as claimed in claim 1, where the information carrier has a pattern of substantially parallel tracks, the tracks comprising address information areas and data areas, the address information areas including the identification information, wherein the organization means are further configured to collect the identification information by reading the address information areas of a predetermined number of tracks and subsequently organizing the address information thus read.

7. The device as claimed in claim 6, wherein the predetermined number of tracks is two, each track including eight address information areas, each address information area comprising 15 bytes of address information, and wherein the addition means are configured to add eight dummy bytes of non-zero value to the identification information.

8. A device for scanning an information carrier that carries first information related to said information carrier and second information related to content accessible by a user, the device comprising:
- a reader configured to read the first information and the second information;
- an error corrector configured to correct errors in the first information and the second information; and
- an organizer configured to organize the first information and the second information in such a manner that both the first information and the second information are processable by the error corrector.

9. The device of claim 8, wherein said error corrector is operable on data having a data format; said organizer organizing at least one of the first information and the second information so that both the first information and the second information have the data format for processing by the error corrector.

10. The device of claim 8, wherein the first information comprises permanent information permanently stored on said information carrier, and the second information comprises rewritable information.

11. The device of claim 10, wherein the permanent information comprises address information and disc information.

12. The device of claim 8, wherein the organizer includes an adder configured to add dummy bytes of predetermined value to the first information.

13. The device of claim 8, further comprising a writer configure to write data on said information carrier.

14. The device of claim 8, where the information carrier has a pattern of substantially parallel tracks, the tracks comprising address information areas and data areas, the address information areas including the first information, wherein the organizer being further configured to collect the first information by reading the address information areas of a predetermined number of tracks and subsequently organizing the address information thus read.

15. The device of claim 14, wherein the predetermined number of tracks is two, each track including eight address information areas, each address information area comprising 15 bytes of address information, and wherein the organizer is configured to add eight dummy bytes of non-zero value to the identification information.

16. The device of claim 8, wherein the first information and the second information including data and parities.

* * * * *